United States Patent
Yokono et al.

(10) Patent No.: US 10,006,383 B2
(45) Date of Patent: Jun. 26, 2018

(54) CONTROL DEVICE AND CONTROL METHOD FOR AN INTERNAL COMBUSTION ENGINE WITH A SUPERCHARGER

(71) Applicant: Mitsubishi Electric Corporation, Chiyoda-ku, Tokyo (JP)

(72) Inventors: Michihisa Yokono, Hyogo (JP); Hideki Hagari, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 682 days.

(21) Appl. No.: 14/596,347

(22) Filed: Jan. 14, 2015

(65) Prior Publication Data

US 2016/0084176 A1    Mar. 24, 2016

(30) Foreign Application Priority Data

Sep. 18, 2014    (JP) ................ 2014-189913

(51) Int. Cl.
*F02D 41/00* (2006.01)
*F02D 41/18* (2006.01)
*F02D 23/00* (2006.01)

(52) U.S. Cl.
CPC ......... *F02D 41/0007* (2013.01); *F02D 41/18* (2013.01); *F02D 23/00* (2013.01);
(Continued)

(58) Field of Classification Search
CPC ................ F02D 41/0007; F02D 41/18; F02D 2200/0414; F02D 2200/0406; F02D 2200/0402; F02D 23/00; Y02T 10/144
(Continued)

(56) References Cited

U.S. PATENT DOCUMENTS

2006/0116808 A1*   6/2006   Tanaka ............. F02D 41/18
                                            701/102
2010/0146966 A1*   6/2010   Burkhardt ........ F02B 37/18
                                            60/602
(Continued)

FOREIGN PATENT DOCUMENTS

| DE | 102010027976 A1 | 10/2011 |
|----|------|------|
| JP | 4237214 B2 | 3/2009 |
| JP | 5420013 B2 | 2/2014 |

OTHER PUBLICATIONS

Communication dated May 6, 2015 from the German Patent and Trademark Office in counterpart application No. 102015200906.8.

*Primary Examiner* — Jason T Newton
(74) *Attorney, Agent, or Firm* — Sughrue Mion, PLLC; Richard C. Turner

(57) ABSTRACT

In a control device and method for an internal combustion engine with a supercharger, a first/second temperature sensor and a first/second air pressure sensor are respectively provided on an upstream/downstream side of a supercharging path from a compressor to a throttle valve. A control portion calculates an inflow air mass to the supercharging path and an outflow air mass from the supercharging path, calculates a throttle upstream air mass in a high operational load state from those air masses, calculates a throttle upstream air mass in a low operational load state from outputs of the first temperature sensor and the first air pressure sensor, selects either one of the throttle upstream air masses depending on an operational load state of the engine, and calculates a throttle upstream pressure based on the upstream air mass selected and a second temperature detected by the second temperature sensor.

18 Claims, 6 Drawing Sheets

(52) U.S. Cl.
CPC ............... *F02D 2200/0402* (2013.01); *F02D 2200/0406* (2013.01); *F02D 2200/0414* (2013.01); *Y02T 10/144* (2013.01)

(58) Field of Classification Search
USPC ........................................................ 123/564
See application file for complete search history.

(56) References Cited

U.S. PATENT DOCUMENTS

| | | | | |
|---|---|---|---|---|
| 2012/0179356 A1* | 7/2012 | Ide | ...................... | F02D 41/0007 701/104 |
| 2012/0290193 A1* | 11/2012 | Suzuki | ................ | F02D 13/0261 701/103 |
| 2015/0013640 A1* | 1/2015 | Watanuki | ................ | F02D 43/00 123/350 |
| 2015/0300916 A1* | 10/2015 | Hagari | ...................... | G01F 3/00 702/45 |
| 2016/0084176 A1* | 3/2016 | Yokono | ............... | F02D 41/0007 123/564 |

* cited by examiner

CONTROL DEVICE AND CONTROL METHOD FOR AN INTERNAL COMBUSTION ENGINE WITH A SUPERCHARGER

BACKGROUND OF THE INVENTION

1. Field of the Invention

The present invention relates to a control device and a control method for an internal combustion engine with a supercharger which can estimate an upstream pressure of a throttle valve (hereinafter, occasionally referred to simply as throttle upstream pressure) in a supercharging path extending from a compressor of a supercharger to the throttle valve, provided in an intake (i.e. suction or inlet) system of an internal combustion engine.

2. Description of the Related Art

Control systems for engines with superchargers for the purpose of enhancing the output of an internal combustion engine (hereinafter, occasionally abbreviated as engine) are conventionally known. As examples of "supercharger", turbochargers in which a turbine is rotated at high speed by the energy of an exhaust gas to thereby drive a compressor mounted on an intake system of engine, and mechanical superchargers in which a compressor is mounted on an intake system of engine and driven through a belt or the like from a crank shaft, and the like are known.

As a system or method for detecting an amount (i.e. quantity) of intake air in an engine control system, there have been known a system for detecting same with an air flow sensor (hereinafter, occasionally abbreviated as AFS), and a so-called speed density system which estimates same based on a pressure within an intake manifold.

In the former AFS system, an air flow (i.e. air flow rate) passing through a portion on which an AFS is mounted (hereinafter, occasionally referred to as AFS intake air amount) is directly measured and air flow flowing into a cylinder (hereinafter, occasionally referred to as cylinder intake air amount) in a normal operation is approximately equal to the AFS intake air amount, so that the AFS system has the feature that the calculation error of the cylinder intake air amount during normal operation is relatively small compared with the speed density system.

Adjustment of engine output is generally carried out by operating a throttle valve (hereinafter, occasionally referred to simply as a throttle or THV) provided in an air intake path and by adjusting the opening area of the air intake path. It is possible to control the air passing through the throttle valve based on a physical calculating equation with detected values of the opening area of the throttle valve, pressure upstream/downstream of the throttle valve related to the flow of air, temperature upstream/downstream of the throttle valve, and the like. This technology is generally used as described in Japanese Patent No. 4,237,214, for example.

However, such a technology is disadvantageous in that a sensor for measuring the pressure upstream of the throttle valve must be provided, thereby increasing the number of parts and cost.

On the other hand, there is a technology for estimating throttle upstream pressure based on intake manifold pressure and average atmospheric density, in which average atmospheric density of a region having combined a turbocharging path extending from the compressor of the turbocharger to the throttle valve with the intake manifold portion is calculated based on AFS intake air amount and cylinder intake air amount.

SUMMARY OF THE INVENTION

However, such a technology as estimating the throttle upstream pressure has a problem of the calculation load on the control device being increased due to complicated calculations.

The present invention has taken account of such a problem, and has accordingly an object to provide a control device and a control method for an internal combustion engine with a supercharger, in which the throttle upstream pressure that is the pressure of the supercharging path between the compressor and the throttle valve can be estimated with less calculation load and with high accuracy.

For achieving the above object, a control device for an internal combustion engine with a supercharger according to the present invention comprises a first temperature sensor and a first air pressure sensor provided on an upstream side of a supercharging path from a compressor of a supercharger to a throttle valve; a second temperature sensor and a second air pressure sensor provided on a downstream side of the supercharging path; and a control portion which calculates, from outputs of all the sensors, an inflow air mass to the supercharging path and an outflow air mass from the supercharging path, calculates an upstream air mass of the throttle valve in a high operational load state from both of the air masses, calculates an upstream air mass of the throttle valve in a low operational load state from outputs of the first temperature sensor and the first air pressure sensor, selects either one of the upstream air masses of the throttle valve depending on an operation load state of the engine, and calculates an upstream pressure of the throttle valve based on the upstream air mass selected and a second temperature detected by the second temperature sensor, thereby controlling various kinds of actuators based on the upstream pressure of the throttle valve.

Also for achieving the above object, the present invention provides a control method for an internal combustion engine with a supercharger, wherein a first temperature sensor and a first air pressure sensor are provided on an upstream side of a supercharging path from a compressor of a supercharger to a throttle valve; and a second temperature sensor and a second air pressure sensor are provided on a downstream side of the supercharging path; the method comprising the steps of; calculating, from outputs of all the sensors, an inflow air mass to the supercharging path and an outflow air mass from the supercharging path, calculating an upstream air mass of the throttle valve in a high operation load state from both of the air masses, calculating an upstream air mass of the throttle valve in a low operation load state from outputs of the first temperature sensor and the first air pressure sensor, selects either one of the upstream air masses of the throttle valve depending on an operation load state of the engine, calculating an upstream pressure of the throttle valve based on the upstream air mass selected and a second temperature detected by the second temperature sensor, and controlling various kinds of actuators based on the upstream pressure of the throttle valve.

Thus, it becomes possible to estimate a throttle upstream pressure with less calculation load and with high accuracy since the calculation is carried out on the assumption that the state of the entire region from the supercharger to the throttle valve is strongly associated with the upstream temperature and the atmospheric density (which is based on the atmospheric pressure and the intake air temperature) of the throttle valve. Therefore, with the estimated value of the throttle upstream pressure, for example a throttle control or a throttle upstream pressure control can be made. Also, in an engine control system with a supercharger equipped with a throttle upstream pressure sensor, for example a fault determination/decision of the throttle upstream pressure sensor can also be applied.

DETAILED DESCRIPTION OF THE PREFERRED EMBODIMENT

Figure 1:
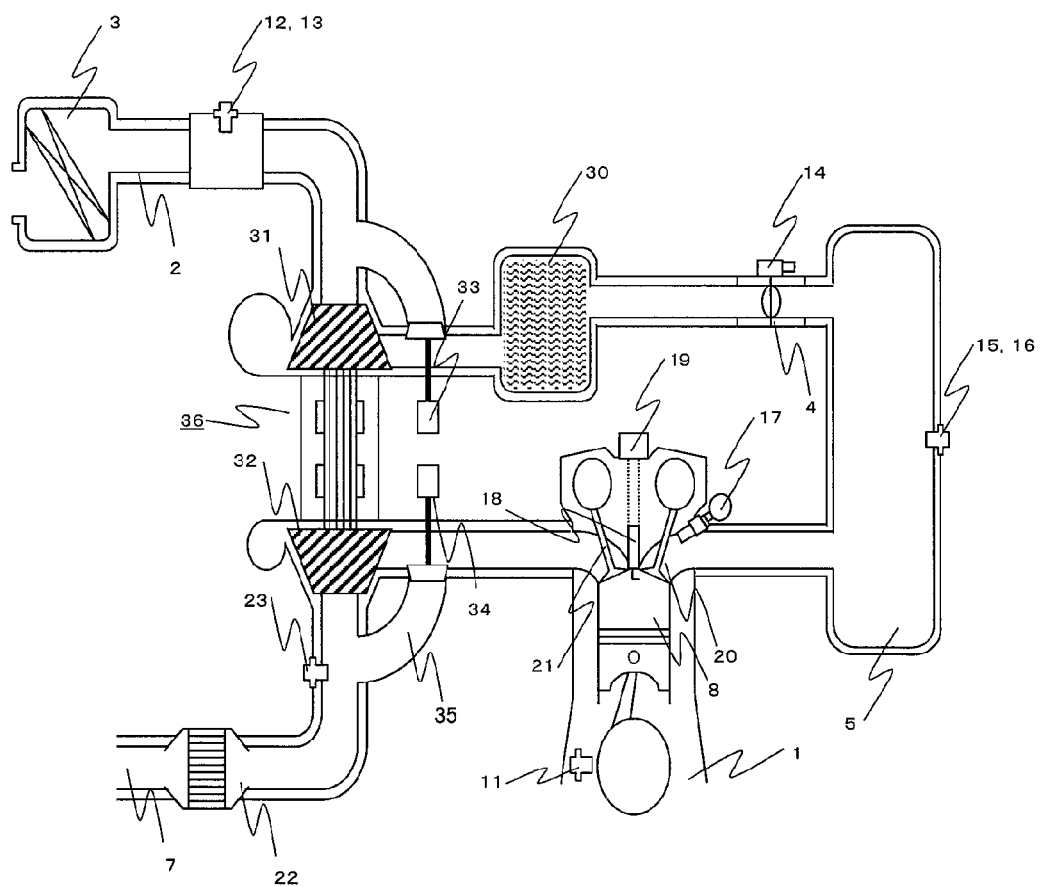
FIG. 1 is a schematic structure diagram of a control device for an internal combustion engine with a supercharger according to Embodiment 1 of the present invention.

In the following, preferred embodiments of a control device and a control method for an internal combustion engine with a supercharger according to the present invention will be described referring to the drawings.

Embodiment 1

In this Embodiment of the present invention shown in FIG. 1, attached to an engine 1 is a crank angle sensor 11 for generating an electrical signal (rotating speed signal) according to the rotation of the crank angle. To the respective cylinders 8 of the engine 1, an intake pipe 2 forming an intake path and an exhaust gas pipe 7 forming an exhaust path are connected.

To an uppermost stream portion of the intake pipe 2 an air cleaner 3 is attached. On the downstream side of the air cleaner 3, an air flow sensor 12 which generates an electrical signal depending on an intake air flow (flow rate) and an intake air temperature sensor 13 which generates an electrical signal depending on an intake air temperature within the intake pipe 2 are integrally or separately formed, where FIG. 1 shows an example of the sensors 12 and 13 being integrally formed.

In a downstream portion of the exhaust pipe 7, an exhaust gas purification catalyst 22 is provided. On an upstream side of the exhaust gas purification catalyst 22, an air-fuel ratio sensor 23 for generating an electrical signal depending on the ratio between combusted fuel and air is provided.

An intake/exhaust system composed of the intake pipe 2 and the exhaust pipe 7 is provided with a turbocharger 36 composed of a compressor 31 and a turbine 32. The turbine 32 is provided beyond the exhaust gas purification catalyst 22 on an upstream side of the exhaust pipe 7, and is adapted to be rotated by exhaust gas flowing in the exhaust pipe 7. The compressor 31 is provided in the intake pipe 2 on a downstream side of the air flow sensor 12. This compressor 31 is rotated with the rotation of the turbine 32, thereby compressing the air within the intake path.

On the downstream side of the compressor 31, an air bypass valve (ABV) 33 for diverting the compressed air amount into the intake pipe 2 is provided so that the turbocharging pressure may not become excessively high mainly when the accelerator is turned off, i.e. at the accelerator OFF time. On a downstream side of the air bypass valve 33, an intercooler (hereinafter, occasionally abbreviated as I/C) 30 for cooling high temperature air caused by an adiabatic compression by the compressor 31 is provided. On a downstream side of the intercooler 30, an electronically controlled-throttle valve 4 for adjusting the air amount forwarded to the engine 1 is provided. To the throttle valve 4, a throttle opening sensor 14 for generating an electrical signal depending on the opening is connected.

On a downstream side of the throttle valve 4, an intake manifold 5 including a surge tank for suppressing intake air pulsation is provided. In the intake manifold 5, an intake manifold pressure sensor 15 and an intake manifold temperature sensor 16 which generate an electrical signal respectively depending on a pressure and a temperature within a space from the surge tank to the intake manifold 5 are integrally or separately formed, where FIG. 1 shows an example of the sensors 15 and 16 being integrally formed.

On a side of the engine 1 that is a downstream side of the intake manifold 5, an injector 17 for injecting fuel is provided, where the injector 17 may be provided to inject fuel directly into the cylinder 8.

The cylinder 8 is provided with an ignition plug 18 for igniting a combustible gas mixture generated by mixing the air inducted by the engine with the fuel injected from the injector 17, and an ignition coil 19 for supplying current for discharging the ignition plug 18. There are also provided an intake valve 20 for adjusting air amount to be introduced within the cylinder 8 from the intake path and an exhaust valve 21 for adjusting the air amount to be exhausted to the exhaust path of the engine 1 from the cylinder 8. It is to be noted that for a cam shaft of both or either one of the intake valve 20 and the exhaust valve 21, a variable valve timing mechanism (VVT) for varying the timing of the valve ON/OFF or a variable valve lift mechanism (VVL) for varying a lift amount of the valve may be provided.

On an upstream side of the turbine 32 and a downstream side of the exhaust valve 21, a waste gate valve 34 for diverting the exhaust gas to the exhaust bypass path 35 is provided so that even when the turbocharging pressure is increased by high rotation speed/high load of engine it will not damage the engine 1. Means for driving the waste gate valve 34 may be of a pressure type for controlling pressure applied to a diaphragm or an electrically driven type for directly driving the valve opening. While the pressure type cannot generally drive the waste gate valve 34 unless a turbocharging pressure is high enough, the motor-driven type has no such restriction, enabling the valve to be driven irrespective of the operation state and so there is the feature that the controllable area of the throttle upstream pressure that is the pressure between the compressor 31 and the throttle valve 4 is wide. While this embodiment employs a motor-driven waste gate valve 34, the pressure type may be applied in a similar way.

Figure 2:
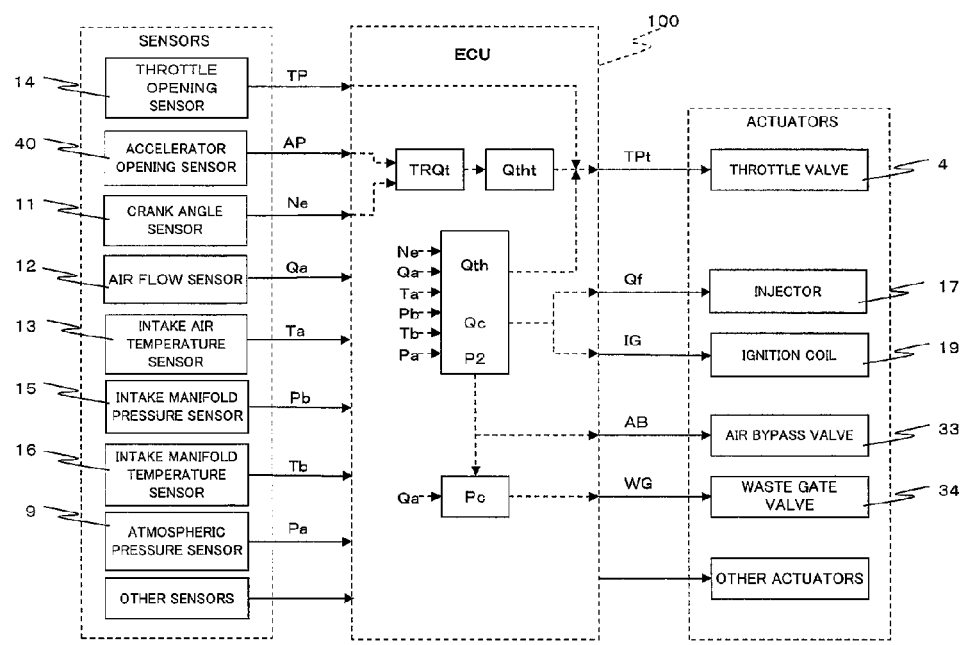
FIG. 2 is a block diagram showing a control system with an electronic control unit (hereinafter, occasionally abbreviated as ECU) used in a control device and a control method for an internal combustion engine with a supercharger according to Embodiment 1 of the present invention.

In the control system shown in FIG. 2, an electronic control unit (ECU) 100 is composed mainly of a microcomputer having a CPU, RAM, ROM etc. as is well known, in which various kinds of control programs (Eqs. (1)-(12) as will be described later) preliminarily stored in the ROM are executed, thereby performing various kinds of controls for the engine 1 based on the operation state or condition of the engine 1 depending on the situation. Namely, the ECU 100 receives detection signals from various kinds of sensors, calculates a target throttle opening, a fuel injection amount, an ignition timing, etc. based on those sensor signals, and outputs signals for driving the throttle valve 4, the injector 17, the ignition coil 19, and the like.

Specifically, the electrical signals out of the throttle opening sensor 14, the crank angle sensor 11, the air flow sensor 12, the intake air temperature sensor 13, the intake manifold pressure sensor 15, and the intake manifold temperature sensor 16 are inputted to the ECU 100. The output signals from the accelerator opening sensor 40 and the atmospheric pressure sensor 9 not shown in FIG. 1 are also inputted to the ECU 100, in which the accelerator opening sensor 40 generates an electrical signal depending on the operation amount of the accelerator pedal by the driver and the atmospheric sensor 9 generates an electrical signal depending on atmospheric pressure, the latter sensor 9 being provided in the vicinity of the air cleaner 3 in FIG. 1 or being provided on a substrate of the ECU 100.

Furthermore, electrical signals from sensors other than the above sensors are also inputted to the ECU 100. Included in those sensors are an air-fuel ratio sensor 23, a knock sensor (not shown) for detecting e.g. vibrations of the cylinder block of the engine 1, a water temperature sensor (not shown) for detecting the coolant temperature of the engine 1, a vehicle speed sensor (not shown) for detecting the vehicle speed, a sensor (not shown) for detecting a throttle upstream temperature (T2) as will be described, and the like.

As will also be described, a temperature on an upstream side of the throttle valve 4 (hereinafter, occasionally referred to as throttle upstream temperature) may be estimated by calculation or may be detected with a temperature sensor (not shown) actually provided on an upstream side of the throttle valve 4.

Also, the throttle valve 4, the injector 17, the ignition coil 19, the air bypass valve 33, and the waste gate valve 34 are connected to the output side of the ECU 100. To the ECU 100, actuators other than the above noted actuators are also connected. Such actuators include actuators for driving a variable valve timing mechanism provided e.g. at the intake valve 20 or the exhaust valve 21.

The ECU 100 calculates a target output torque TRQt sought by a driver from engine rotation speed Ne calculated based on a crank angle period from the crank angle sensor 11 and an accelerator opening AP calculated based on the output of the accelerator opening sensor 9. Also, the ECU 100 calculates a target throttle intake air amount Qtht required for achieving the target output torque TRQt and calculates a target throttle opening TPt required for achieving the target throttle intake air amount Qtht, based on which the throttle valve 4 is driven. In order to achieve the target throttle opening TPt with high accuracy, a feedback control (shown by dotted lines) with the throttle opening TP from the throttle opening sensor 14 is also carried out.

Also, the ECU 100 calculates a throttle upstream pressure P2 that is a pressure between the compressor 31—the throttle valve 4 as well as a throttle intake air amount Qth passing through the throttle valve 4, by using a physical model of the intake system as will be described, based on the engine rotation speed Ne, intake air amount Qa from the air flow sensor 12, intake air temperature Ta from the intake air temperature sensor 13, intake manifold pressure Pb from the intake manifold pressure sensor 15, intake manifold temperature Tb from the intake manifold temperature sensor 16, and atmospheric pressure Pa from the atmospheric pressure sensor 9.

While not described in detail, based on a cylinder intake air flow amount Qc calculated with those values, the injector 17 is driven to provide a fuel injection amount Qf which achieves a target air-fuel ratio for providing a proper exhaust gas or exhaust temperature, and the ignition coil 19 is driven to achieve a proper ignition timing IG not causing abnormal combustion such as knocking, where for the calculation of the fuel injection amount Qf, a feedback control based on the target air-fuel ratio and the output value of the air-fuel ratio sensor 23 is also performed.

Also, in order to achieve the aforementioned target throttle intake air amount Qtht with high accuracy, a feedback control of the target throttle opening TPt by using a throttle intake air amount Qth is also carried out. Also, from the AFS intake air amount Qa and the throttle upstream pressure P2, a compressor driving force Pc is calculated, a target waste gate opening WG for preventing the intake system pressure or the engine output from being increased excessively is calculated based on the compressor driving force Pc, and the engine output control for driving the waste gate valve 34 is also carried out (see Japanese Patent No. 5,420,013). Also, an air bypass valve opening is calculated so that the throttle upstream pressure P2 may not become excessively high due to unintentional excessive turbocharging, thereby performing a control for driving the air bypass valve 33.

Thus, an engine control is performed in the ECU 100, where based on a physical mode of the intake air system, a method for calculating the throttle upstream pressure P2, that is a pressure between the compressor 31 and the throttle valve 4, the cylinder intake air amount Qc entering into the cylinder 8, and the throttle intake air amount Qth passing through the throttle valve 4 will now be described referring to FIGS. 1 and 2 as above mentioned as well as FIGS. 3-8 as described below.

Air state change in each region of the control device for an internal combustion engine with a supercharger according to Embodiment 1 of the present invention shown in FIG. 3 and sensors for detecting the variation will be defined as follows, where "n" indicates a stroke number:

Qcmp(n): Average value during one stroke of engine of compressor intake air amount [g/s]
Gcmp(n): Average value during one stroke of engine of compressor intake air mass [g]
Qa(n): Average value during one stroke of engine of AFS intake air amount [g/s]
Qth(n): Average value during one stroke of engine of throttle intake air amount [g/s]
Gth(n): Average value during one stroke of engine of throttle intake air mass [g]
Qc(n): Average value during one stroke of engine of cylinder intake air amount [g/s]

G2(n): Average value during one stroke of engine of throttle upstream (within V2) air mass [g]
ΔT(n): Time interval of one stroke of engine [s]
V2: I/C upstream volume (between compressor—throttle valve) [m³]
Pa(n): Average value during one stroke of engine of atmospheric pressure [kPa]
P2(n): Throttle upstream pressure (estimated value) [kPa]
Pb(n): Average value during one stroke of engine of intake manifold pressure [kPa]
Ta(n): Average value during one stroke of engine of intake air temperature [K]
T2u(n): Average value during one stroke of engine of I/C upstream temperature [K]
T2(n): Average value during one stroke of engine of throttle upstream temperature (I/C downstream temperature) [K]
Tb(n): Average value during one stroke of engine of intake manifold temperature [K]
ρa(n): Average value during one stroke of engine of atmospheric density [g/m³]

Since the throttle upstream pressure is not measured by sensors in the following examples, the description will be made supposing that an estimated value of the throttle upstream pressure P2 has already been calculated at the last or previous stroke of engine, where the initial value or default is applied at the first stroke. The calculation of the estimated value of throttle upstream pressure P2 will be described later.

Figure 3:
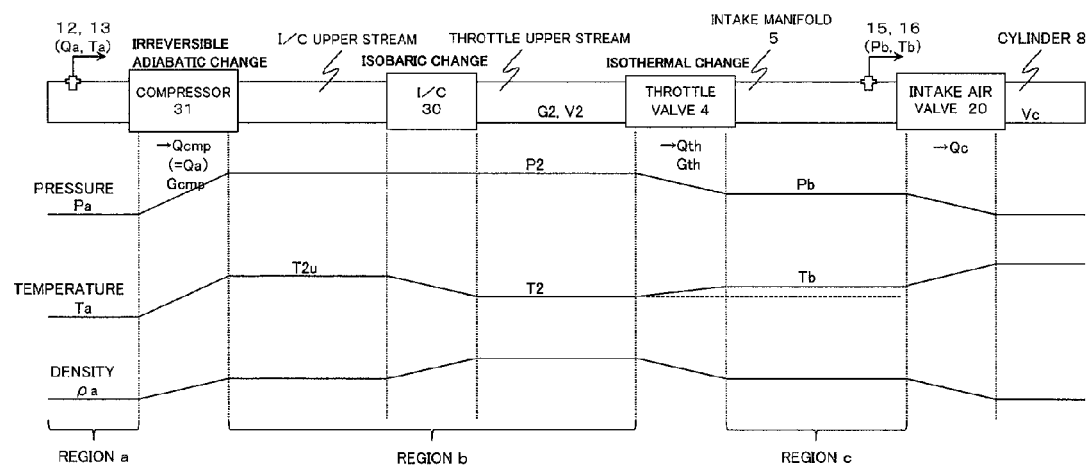
FIG. 3 is a schematic diagram showing an air state change in each region and its associated parameter values in a control device and a control method for an internal combustion engine with a supercharger according to Embodiment 1 of the present invention.

In the state change or variation of FIG. 3, the upstream side (region a) of the compressor 31 is open to the atmosphere, basically assuming the atmospheric pressure Pa (sensor measurement) and the intake air temperature Ta (sensor measurement). Strictly, a pressure loss or the like by the air cleaner 3 is conceivable, but is neglected hereafter. The compressor 31 performs the compression subject to a reversible adiabatic change, so that the pressure and the temperature increase on the I/C upstream side that is a downstream side of the compressor 31 and the atmospheric density also increases. Consequently, passing through the I/C 30, where the pressure loss is neglected as above, the temperature is reduced on the throttle upstream side that is the downstream side of the I/C 30, and the atmospheric density is increased.

Thus, the state change upon passing through the I/C 30 becomes an isobaric change, so that the pressure of the region b (hereinafter, occasionally referred to as turbocharging path) from the compressor 31 to the throttle valve 4, that is on the throttle upstream side as well as the I/C upstream side, assumes a common throttle upstream pressure P2 (estimated value), and the temperature thereof assumes the I/C upstream temperature T2u on the I/C upstream side and the throttle upstream temperature T2 on the throttle upstream side.

Then, the air passes through the throttle valve 4, where it is throttled and then expanded, and remains in the intake manifold 5. Therefore, the state change on both sides of the throttle valve 4 becomes an isothermal change, where only the pressure is decreased, the atmospheric density is also decreased, and the temperature slightly increases in the presence of heat received from the engine 1. As a result, the pressure of the region c assumes the intake manifold pressure Pb (sensor measurement), and the temperature thereof assumes the intake manifold temperature Tb (sensor measurement).

Next, a method for calculating the air mass of the region b will be described. The air mass of the region b can be calculated based on the following Eq. (1) according to the law of conservation of mass, where the compression intake air mass, i.e. the inflow air mass to the region b is Gcmp, and the throttle intake air mass, i.e. the outflow air mass from the region b is Gth:

$$G_2(n) = G_2(n-1) + G_{cmp}(n) - G_{th}(n) \qquad \text{Eq. (1)}$$

Namely, the air mass of the region b can be calculated based on the balance between Gcmp that is an inflow air mass to the region b and Gth that is the outflow air mass from the region b.

Gcmp that is the inflow air mass to the region b is calculated from the value Qa measured by the AFS 12. The air amount Qa measured by the AFS 12 generally indicates an air mass per unit time to be outputted to the ECU 100, so that the inflow air mass during a single stroke of engine (ΔT) can be calculated based on the following Eq. (2), where the compressor intake air mass Qcmp is considered substantially equal to the AFS intake air amount Qa:

$$G_{cmp}(n) = Q_{cmp}(n) \times \Delta T(n) \qquad \text{Eq. (2)}$$

The outflow air mass Gth from the region b can be calculated based on a volume flow calculating equation of a so-called throttle type flow meter (in case of compressible fluid) before or after the throttle valve 4, where the volume flow calculating equation is expressed by the following Eq. (3):

$$Q_{thv} = \alpha_2 \times CA_t \times \sqrt{\frac{2}{\kappa-1} \times \left[\left(\frac{P_b}{P_2}\right)^{\frac{2}{\kappa}} - \left(\frac{P_b}{P_2}\right)^{\frac{\kappa+1}{\kappa}}\right]} \qquad \text{Eq. (3)}$$

It is assumed that the throttle intake air amount (volume flow) be Qthv [L/s], the acoustic velocity on the throttle upstream side be α2 [m/s], and the throttle effective opening area be CAt [cm²], where the acoustic velocity α2 can be calculated from a well-known physical equation based on the throttle upstream temperature T2 and the throttle effective opening area CAt can be calculated from the output value of throttle opening sensor 14 based on a characteristic of the throttle valve 4. The throttle valve 4 has a device variation, causing a difference with the predetermined characteristic value, so that a learning-corrected value for such a device variation is used as the effective opening area CAt.

Since the atmospheric pressure Pa and the intake air temperature Ta in the region a are sensor measurements, the atmospheric density ρa, that is the atmospheric density of the region a, can be calculated based on the following state Eq. (4), where R is a gas constant:

$$P_a = \rho_a \times R \times T_a \qquad \text{Eq. (4)}$$

$$\therefore \rho_a = \frac{P_a}{R \times T_a}$$

Based on the volume flow Qthv, the throttle intake air amount (mass flow) Qth can be calculated from the following Eq. (5), where the standard atmospheric pressure is P0 [kPa] and the standard temperature is T0 [K]:

$$Q_{th} = Q_{thv} \times \rho_a \times \frac{T_0}{T_2} \times \frac{P_2}{P_0} \qquad \text{Eq. (5)}$$

The outflow air mass Gth(n) during a single stroke that is the outflow air mass of the region b can be calculated based on the following Eq. (6):

$$G_{th}(n) = Q_{th}(n) \times \Delta T(n) \qquad \text{Eq. (6)}$$

Next, a method for calculating the throttle upstream pressure P2 will be described.

The air mass G2 of the region b can be calculated with the aforementioned equation, and the throttle upstream pressure P2 that is the pressure of the region b can be calculated based on the following Eq. (7):

$$P_2 = \frac{G_2 \times T_2 \times R}{V_2} \qquad \text{Eq. (7)}$$

The region b has two different states respectively on the upstream side region and the downstream side region of the I/C 30. As above described, the atmospheric density and the temperature depend on those side regions, so that for calculating the throttle upstream pressure P2 with higher accuracy it is necessary to calculate the air mass and the temperature of those side regions separately. If a means for measuring the state for each region such as a temperature sensor is additionally provided, it becomes possible to calculate the air mass and the pressure of each side region with high accuracy by solving the state equations. However, the addition of sensors gives rise to a cost increase.

It is also possible to estimate, without adding sensors, the temperature or air mass etc. of those side regions with various kinds of physical equations such as state equations. However, this requires a large number of complicated calculations and it is conceivable that this would have a large influence on the final calculation results due to errors included in those complicated calculations. Therefore, it becomes possible to calculate the throttle upstream pressure P2 with high accuracy and with a low calculation load, by supposing that the entire state of the region b is strongly associated with the atmospheric density pa and the temperature T2 from the I/C 30 to the throttle valve 4.

Next, a method for calculating the air mass of the region b in case where the intake air amount is low such as when the engine 1 is idling or decelerating with release of the accelerator will be described.

As above described, the turbine 32 is rotated by the exhaust gas and the compressor 31 associated with the turbine 32 is rotated, thereby supercharging the pressure of the throttle upstream. Therefore, in a region of less exhaust gas amount, i.e. less throttle passing air amount, the rotational speed of the turbine is low, so that the supercharging with the compressor 31 does not work and the pressure on the downstream side (throttle upstream side) of the compressor 31 is substantially the same as the state in the region a. Here it is conceivable that the state of the temperature or atmospheric density etc. of the region b is substantially the same as the state of the upstream of the compressor 31, so that the air mass of the region b can be calculated based on the following Eq. (8):

$$G_2 = \rho_a \times V_2 \qquad \text{Eq. (8)}$$

While it is also possible to calculate the air mass G2 of the region b in a low load region even with the calculation method of Eq. (1) using the balance between Gcmp and Gth as aforementioned, it is generally confirmed that in a range of less intake air amount, it is easy for the error of the value of the intake air amount detected by the AFS 12 to become large. Therefore, it is conceivable that during the operation in the low load range, an error may arise when the air mass G2 of the region b is calculated with a calculation method using the balance between Gcmp and Gth as described above.

Accordingly, by switching the calculation method of the air mass G2 of the region b with the intake air amount Gth to the engine 1 between a method using the balance between Gcmp and Gth of the aforementioned Eq. (1) and a method using the atmospheric density of the aforementioned Eq. (8), it becomes possible to calculate the throttle upstream pressure P2 without influence of such an error even in a low load operation range where such an error of the intake air amount detected by the AFS 12 becomes large.

On the other hand, it is conceivable that the value of the air mass G2 used for the calculation of the throttle upstream pressure P2 may have a step or a level difference when the calculation method of the air mass G2 is switched according to the transition from a high load range to a low load range of the engine operation state (Gth). Such a level difference may cause an influence on the engine operation performance or driver's feeling. Therefore, it is preferable to avoid such a level difference by filtering the throttle upstream pressure P2 with a primary filter etc.

Although such filtering methods include a number of types such as moving-averaging or primary filtering etc., since the intake system of the engine is known as having a primary delay element, by using primary filtering, that is a common filtering method which puts less burden on the calculation process, it is possible to smooth the level difference to a state close to the actual pressure behavior. It is conceivable that the filter gain is correlated to the ratio of the outflow air mass Gth to (the air mass G2+the inflow air mass Gcmp). This relationship is represented by the following Eq. (9), where with the filter gain set with the relationship of Eq. (9), the filter gain FG can be set suitable for the operational states of the engine:

$$\text{Filter Gain}(FG) \propto \frac{G_{th}}{G_2 + G_{cmp}} \qquad \text{Eq. (9)}$$

Next, a method for calculating the air mass of the region b when the intake amount is high e.g. upon full throttle of the engine will be described.

While the throttle intake air amount Qthv is calculated according to Eq. (3) based on the effective opening area CAt of the throttle valve 4, the maximum intake air amount is restricted by the engine rotational speed Ne, the intake manifold pressure Pb, and the exhaust gas amount, so that the intake air amount actually flowing in a large opening range of the throttle particularly at a low engine rotational speed assumes a value lower than the intake air amount Qthv calculated by Eq. (3).

Under such operating conditions, the outflow air mass Gth has a value higher than the actual value, so that the air mass G2 on the throttle upstream side is decreased from Eq. (1) and the throttle upstream pressure P2 is to be calculated as a value lower than the actual one. Since the relationship between the throttle upstream pressure P2 and the intake manifold pressure Pb is physically established as P2≥Pb in consideration of the flow of air, the pressure P2 of the region b can be considered higher than Pb. Therefore, a lower limit value (clip value) G2lim of the air mass G2 in the region b can be calculated based on the following Eq. (10):

$$G_{2lim} = \frac{P_b + X}{T_2 \times R} \times V_2 \qquad \text{Eq. (10)}$$

The above X is an offset value upon supposing that a pressure difference, between the throttle upstream pressure P2 and the intake manifold pressure Pb, may arise even at the full throttle. By the lower limit-clipping of the air mass in the region b with that lower limit clip value G2*lim*, the throttle upstream pressure P2 can be calculated with high accuracy even in a large throttle opening range.

Here, a method for calculating the estimated value without measuring the throttle upstream temperature T2 will be described.

The downstream system of the I/C 30 in the region b decreases in temperature after the air has passed through the I/C 30, where this decreased amount of temperature cannot simply be estimated because it is highly influenced by the cooling ability of the I/C 30 or the atmosphere for cooling. Therefore, by focusing on that both sides of the throttle valve 4 exhibit an isothermal change accompanying a slight temperature change, the throttle upstream temperature T2 can be approximated based on e.g. the following Eq. (11) with the intake manifold temperature Tb that is a sensor measurement:

$$T_2 = K_a \times T_b + K_b \qquad \text{Eq. (11)}$$

It may be tentatively assumed that Ka=1.0 and Kb=0.0, in which determining approximation coefficients from the measurements can enhance the accuracy.

On the other hand, upon the switchover (B605 in FIG. 6) in the calculation process of the air mass G2 in the region b according to the aforementioned engine operation state, concurrently the estimated value of the throttle upstream temperature T2 during a low load range-operation time is switched over to the intake air temperature Ta. This switchover enables the throttle upstream temperature T2 suitable for the operation state to be calculated. It is conceivable that the switchover of the throttle upstream temperature T2 also causes a level difference, so that the filtering may be made.

Next, the operation process actually executed within the ECU 100 based on the physical model of the intake system will be specifically described referring to FIGS. 4-9, where the following description presupposes that the estimated value P2 of the throttle upstream pressure has already been calculated in advance by a single stroke of engine, an initial value of the throttle upstream pressure P2 being preset at the first calculation.

The calculation processes shown in FIGS. 4-8 are executed within an interrupt processing (hereinafter, referred to as B05 interrupt processing) executed per a predetermined crank angle (e.g. BTDC5 degCA) of the crank shaft in synchronization with the rotation of the engine 1. Also, the following calculation includes a calculation using an average value, during a single stroke of engine, of values detected by the sensors, which can be obtained by having preliminarily detected the sensor output values per a predetermined interval (e.g. 1 ms or 10 degCA) and calculating an average value of all the sensor values detected between the last B05 interrupt processing start time and the current B05 interrupt processing start time.

Figure 4:
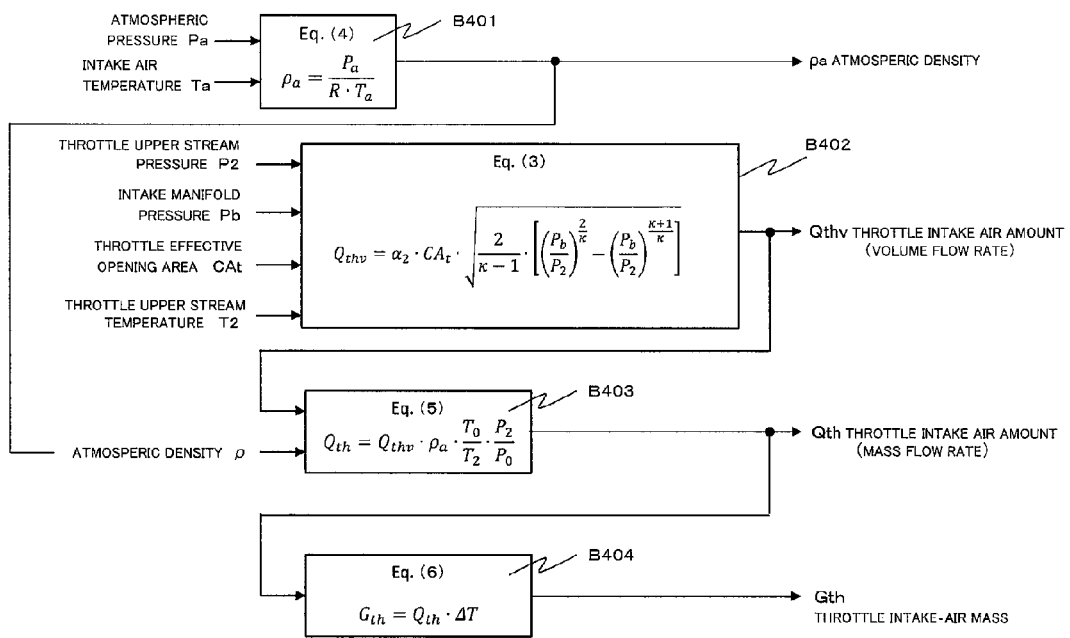
FIG. 4 is a calculation block diagram for calculating a throttle intake air mass in Embodiment 1 of the present invention.

Firstly, the process of calculating the throttle intake air mass Gth shown in FIG. 4, i.e. the outflow air mass Gth from the region b will be described.

At block B401, based on Eq. (4), the atmospheric density pa(n) is calculated from the atmospheric pressure Pa(n) and the intake air temperature Ta(n). At block B402, based on Eq. (3), the throttle intake air amount (volume flow) Qthv is calculated from the throttle upstream pressure P2 at the previous stroke (or initial value) of engine, the intake manifold pressure Pb, the throttle effective opening area CAt, and the throttle upstream temperature T2 (determined from blocks B801-B803 as will be described).

Then at B403, based on Eq. (5), the throttle intake air amount (mass flow) Qth is calculated from the throttle intake air amount (volume flow) Qthv, the throttle upstream pressure P2 at the last stroke, the throttle upstream temperature T2, and the atmospheric density pa. Then, at block B404, based on Eq. (6), the throttle intake air mass, that is the outflow air mass Gth from the region b, is calculated from the throttle intake air amount (mass flow) Qth and a time interval ($\Delta$T) during a single stroke.

Figure 5:
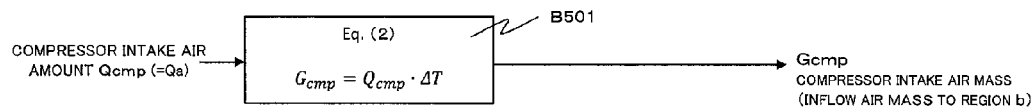
FIG. 5 is a calculation block diagram for calculating a compressor intake air mass in Embodiment 1 of the present invention.

Next, the process of calculating the compressor intake air mass Gcmp shown in FIG. 5, i.e. the inflow air mass Gcmp to the region b will be described.

At block B501, based on Eq. (2), the compressor intake air mass, i.e. the inflow air mass Gcmp to the region b is calculated from the compressor intake air amount Qcmp and the time interval $\Delta$T for a single stroke, where the compressor intake air amount Qcmp is considered equal to the AFS intake air amount Qa measured by the AFS 12.

Figure 6:
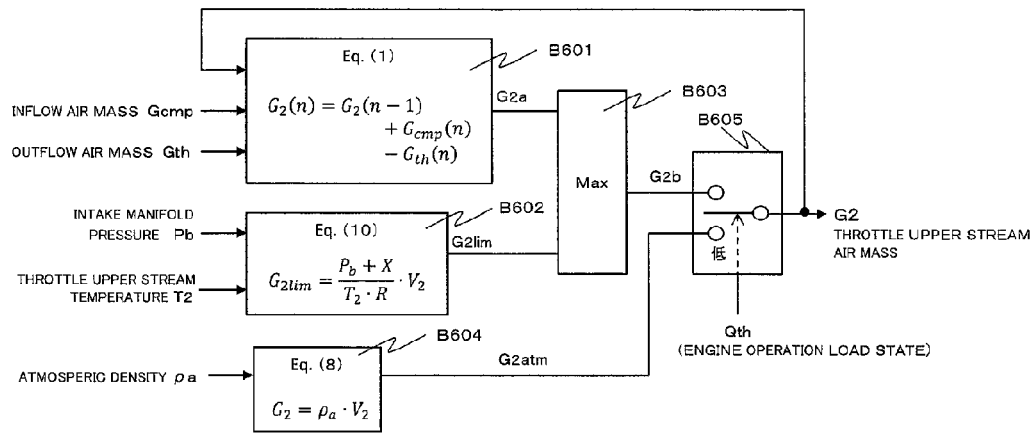
FIG. 6 is a calculation block diagram for calculating a throttle upstream air mass in Embodiment 1 of the present invention.

Then, the process of calculating the throttle upstream air mass G2 shown in FIG. 6 will be described.

At block B601, based on Eq. (1), the throttle upstream air mass G2*a* is calculated from the throttle upstream air mass G2(*n*−1) at the previous stroke of engine as well as the inflow air mass Gcmp(n) and the outflow air mass Gth(n) at the current stroke. At block B602, based on Eq. (10), the throttle upstream air mass-lower limit value G2*lim* is calculated from the intake manifold pressure Pb and the throttle upstream temperature T2. The value X used in this calculation is a preset value, which is set to have a value corresponding to the pressure difference between the throttle upstream pressure P2 and the intake manifold pressure Pb at full throttle, or may be set with a single parameter, or may be set in a table of engine rotational speed.

At block B603, by the comparison of G2*a* from block B601 with G2*lim* from block B602, a larger value is selected and outputted as G2*b*. At block B604, based on Eq. (8), the throttle upstream air mass G2*atm* during the low load time is calculated from the atmospheric density pa and the turbocharging path volume V2.

At block B605, the output switchover is carried out depending on the operational load state of the engine 1. The switchover determination is carried out by e.g. the throttle intake air amount Qth, where G2*atm* on the low load side is selected and outputted as the throttle upstream air mass G2 if the throttle intake air amount Qth is lower than the predetermined threshold value, which indicates that the operational load state is in the low load range, while G2*b* is selected and outputted as the throttle upstream air mass G2 if the throttle intake air amount Qth is not lower than the predetermined threshold value, which indicates that the operation load state is not in the low load range. The threshold value used for determining the low load range is set to a value capable of determining that the throttle upstream pressure that is on the downstream side of the compressor 31 is substantially the same as the state of the atmospheric pressure, where it may be a set value of a single parameter or a set value etc. in a table of engine rotational speed.

Figure 7:
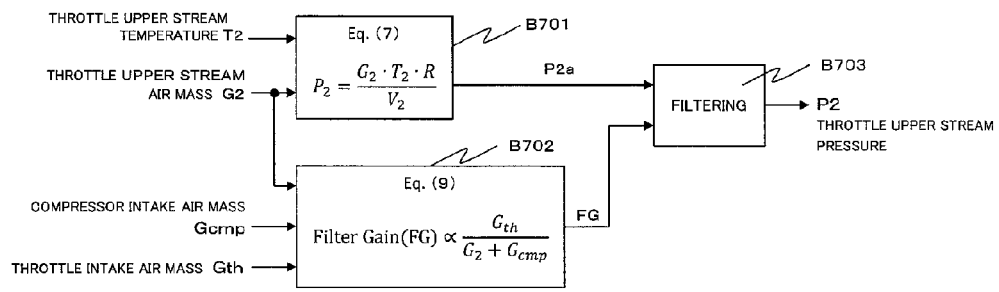
FIG. 7 is a calculation block diagram for calculating a throttle upstream pressure in Embodiment 1 of the present invention.

Next, the process of calculating the throttle upstream pressure P2 shown in FIG. 7 will be described.

At block B701, based on Eq. (7), P2a is calculated from the throttle upstream air mass G2 and the throttle upstream temperature T2. At block B702, the filter gain FG is calculated from the throttle upstream air mass G2, the inflow air mass Gcmp, and the outflow air mass Gth. This filter gain FG has a correlation between for example, the outflow air amount Gth and the throttle upstream air mass G2+the inflow air mass Gcmp as expressed by Eq. (9), so that it may be calculated from the calculation equation of Gth/(G2+Gcmp) or may be set in a table assigned by the calculation result of Gth/(G2+Gcmp).

For calculating with a calculation equation, e.g. for performing the primary filtering with the following Eq. (12), with the calculation result of (1−Gth/(G2+Gcmp)) being used for the fitter gain FG, the filter gain FG can be adjusted in conjunction with the engine operational load state:

$$P2(n) = P2(n-1) \times FG + P2a \times (1-FG) \qquad \text{Eq. (12)}$$

At block B703, filtering P2a with the filter gain FG is performed to calculate the throttle upstream pressure P2. For the filtering, a low pass filtering, calculating of a simple moving-average value over the values during several strokes in the past, or weighted moving-averaging (averaging weighted differently to individual data during several strokes in the past) may be used. It is necessary to adapt the set value of the filter gain FG set at block B702 according to the filtering method to a value proper to the filtering method.

Figure 8:
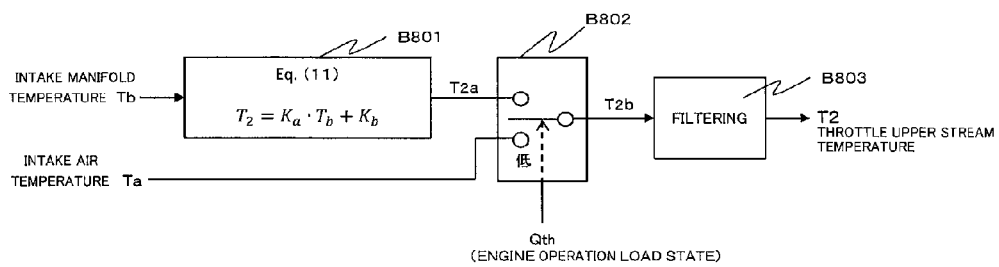
FIG. 8 is a calculation block diagram for calculating a throttle upstream temperature in Embodiment 1 of the present invention.

Next, the calculation process for estimating the throttle upstream temperature T2 shown in FIG. 8 will be described.

At block B801, based on Eq. (11), T2a is calculated from the intake manifold temperature Tb. At block B802, the switchover is carried out at the timing of Gth in the same way as the block B605, in which if the throttle intake air amount Qth is lower than the predetermined threshold value, the intake air temperature Ta on the low load side is selected and outputted as T2b while if the throttle intake air amount Qth is not lower than the predetermined threshold value, T2a on the low load side is selected and outputted as T2b. At block B803, the filtering is carried out, so that from T2b the throttle upstream temperature T2 is calculated.

For the filtering, the low pass filtering, calculating of a simple moving-averaging to the values during several strokes in the past, or weighted moving-averaging (averaging weighted differently to individual data during several strokes in the past) may be used. A filter gain used for the filtering is preset, where it may be set with a single parameter or set in a table of other information.

Figure 9:
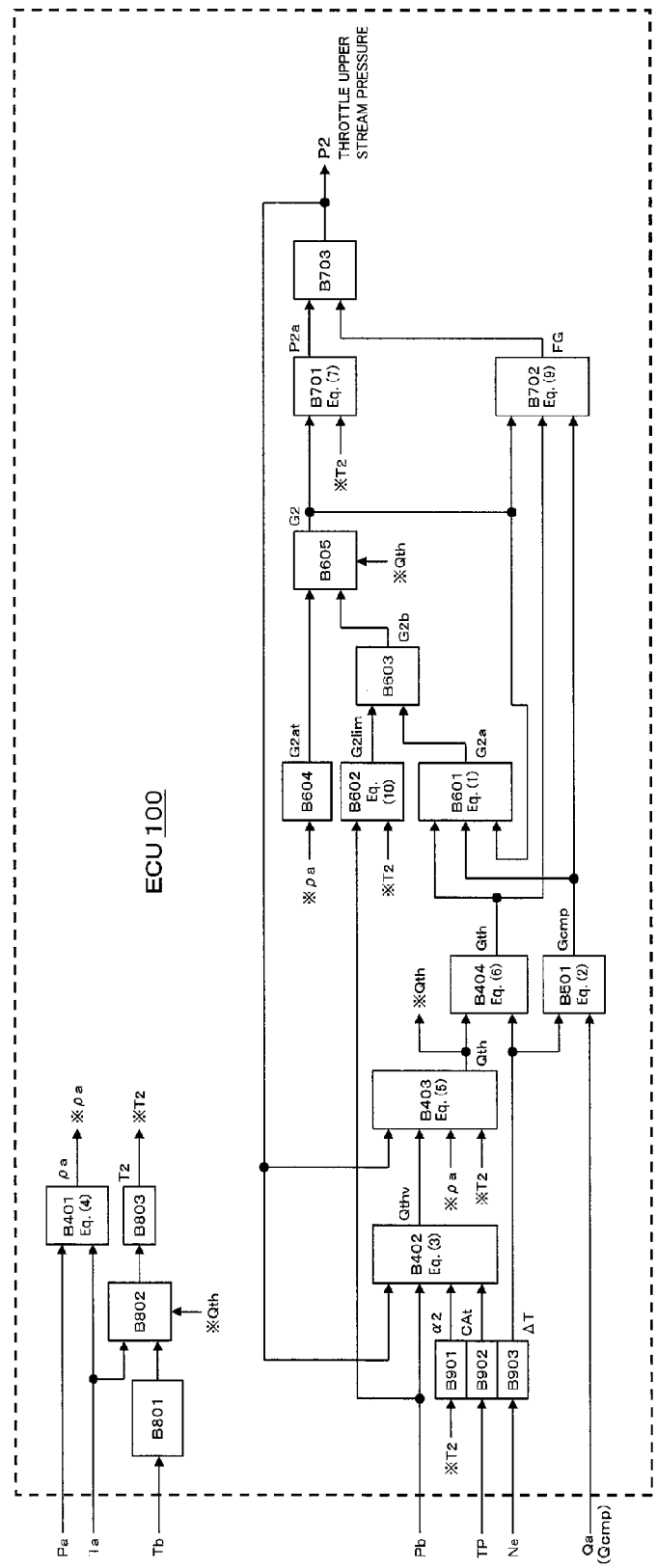
FIG. 9 is a block diagram showing a mutual connection among FIGS. 4-8 within ECU in Embodiment 1 of the present invention.

FIG. 9 shows a connection between blocks described referring to FIGS. 4-8 in the ECU 100, where block B901 not shown in FIGS. 4-8 calculates an acoustic speed α2 based on the throttle upstream temperature T2. The relationship of acoustic speed with temperature is a well-known physical phenomenon, so that detailed descriptions of relation equations, etc. are omitted. The relationship of the acoustic speed α2 with the throttle upstream temperature T2 for reducing the calculation process may be set and calculated with a table. The block B902 calculates the effective opening area CAt of the throttle valve 4 based on the throttle opening TP.

While the effective opening area CAt can be calculated based on characteristic values of the throttle valve 4, the throttle valve 4 has a device variation and causes a difference with preset characteristic values, so that a value subject to a learning correction for such a device variation is used for the effective opening area CAt. The block B903 measures a cycle time between a predetermined crank angle (for example, BTDC5 degCA) based on a signal from the crank angle sensor 11.

While the throttle upstream pressure P2 is calculated with the calculations shown in FIGS. 4-9, the throttle upstream pressure P2 is used upon the upstream calculation of the throttle upstream pressure P2. For this, the throttle upstream pressure P2 at the previous stroke of engine may be used as described above. Upon using the throttle upstream pressure P2 at the previous stroke of engine, the intake manifold pressure Pb used for the calculation of the pressure ratio at the block B402 also needs to use a value at the previous stroke of engine.

Thus, the calculation in the calculation order shown in FIGS. 4-8 enables it to be used within the engine control system by packaging the physical model of the intake system within the ECU 100, so that by using the throttle upstream pressure P2 thus calculated, the throttle opening, the throttle intake air amount, the output torque, or the like can be controlled with high accuracy in an engine control system with turbocharger.

As described above, this embodiment applies the physical model of intake system of the present invention to a control system for an engine with turbocharger, thereby estimating the throttle upstream pressure P2. With this estimated P2, even in a system without throttle upstream pressure sensors, the throttle intake air amount or the like can be calculated with high accuracy. Also, in a system with a throttle upstream sensor, the estimated P2 can be applied to a fault diagnosis or the like for the throttle upstream pressure sensor.

What is claimed is:

1. A control device for an internal combustion engine with a supercharger comprising:
   a first temperature sensor and a first air pressure sensor provided on an upstream side of a supercharging path from a compressor of a supercharger to a throttle valve;
   a second temperature sensor and a second air pressure sensor provided on a downstream side of the supercharging path; and
   a control portion which calculates, from outputs of all the sensors, an inflow air mass to the supercharging path and an outflow air mass from the supercharging path, calculates an upstream air mass of the throttle valve in a high operational load state from both of the air masses, calculates an upstream air mass of the throttle valve in a low operational load state from outputs of the first temperature sensor and the first air pressure sensor, selects either one of the upstream air masses of the throttle valve depending on an operation load state of the engine, calculates an upstream pressure of the throttle valve based on the selected one of the upstream air masses and a second temperature detected by the second temperature sensor, and controls at least one actuator of the internal combustion engine based on the calculated upstream pressure of the throttle valve.

2. The control device for an internal combustion engine with a supercharger according to claim 1, wherein
   the first temperature sensor comprises an intake air temperature sensor which detects an intake air temperature of an intake air pipe connected to the compressor;
   the first air pressure sensor comprises an atmospheric pressure sensor which detects an environmental atmospheric pressure and an intake air flow sensor which detects an intake air flow of the intake air pipe;

the second temperature sensor comprises an intake manifold temperature sensor which detects a temperature of an intake manifold portion on a downstream side of the throttle valve;

the second air pressure sensor comprises an intake manifold pressure sensor which detects an intake manifold pressure of the intake manifold portion;

the control portion comprises:

a first portion which calculates a second throttle upstream air mass from a first throttle upstream pressure calculated at a previous stroke of engine, the intake manifold pressure, a throttle upstream temperature, the atmospheric pressure, the intake air temperature, the intake air flow, and a first throttle intake air mass calculated at the previous stroke of engine;

a second portion which selects either one of the second throttle upstream air mass and a third throttle upstream air mass calculated from the atmospheric pressure and the intake air temperature, as a fourth throttle upstream air mass, depending on the operational load state of the engine; and a third portion which calculates a second throttle upstream pressure from the fourth throttle upper air mass and the throttle upstream temperature, and the control portion further controls the at least one actuator based on the calculated second upstream pressure.

3. The control device for an internal combustion engine with a supercharger according to claim 2, wherein the throttle upstream temperature is the intake manifold temperature or a temperature which is linearly approximated to the intake manifold temperature.

4. The control device for an internal combustion engine with a supercharger according to claim 2, wherein the throttle upstream temperature is a temperature which is detected by a sensor provided on the upstream side of the throttle valve.

5. The control device for an internal combustion engine with a supercharger according to claim 3, wherein the control portion further comprises a fourth portion which selects either the intake manifold temperature or the temperature which is linearly approximated to the intake manifold temperature and the intake manifold temperature in synchronization with the operational load state of the engine as the throttle upstream temperature.

6. The control device for an internal combustion engine with a supercharger according to claim 2, wherein the control portion further comprises a fifth portion which calculates a lower limit value of the throttle upstream air mass from the intake manifold pressure and the throttle upstream temperature and selects either a larger one of the lower limit value and the second throttle upstream air mass.

7. The control device for an internal combustion engine with a supercharger according to claim 2, wherein the third portion includes a primary filter for smoothing the second throttle upstream pressure.

8. The control device for an internal combustion engine with a supercharger according to claim 5, wherein the fourth portion further comprises a filter for smoothing the throttle upstream temperature selected.

9. The control device for an internal combustion engine with a supercharger according to claim 2, wherein the operational load state of the engine is a throttle intake air amount, calculated in the process of calculating the second throttle upstream air mass.

10. A control method for internal combustion engine with supercharger, wherein a first temperature sensor and a first air pressure sensor are provided on an upstream side of a supercharging path from a compressor of a supercharger to a throttle valve; and a second temperature sensor and a second air pressure sensor are provided on a downstream side of the supercharging path;

the method comprising the steps of:

calculating, from outputs of all the sensors, an inflow air mass to the supercharging path and an outflow air mass from the supercharging path;

calculating an upstream air mass of the throttle valve in a high operation load state from both of the air masses;

calculating an upstream air mass of the throttle valve in a low operation load state from outputs of the first temperature sensor and the first air pressure sensor, selects either one of the upstream air masses of the throttle valve depending on an operation load state of the engine;

calculating an upstream pressure of the throttle valve based on the selected one of the upstream air masses and a second temperature detected by the second temperature sensor; and controlling at least one actuator of the internal combustion engine based on the calculated upstream pressure of the throttle valve.

11. The control method for an internal combustion engine with a supercharger according to claim 10, wherein the first temperature sensor detects an intake air temperature of an intake air pipe connected to the compressor;

the first air pressure sensor detects an environmental atmospheric pressure and an intake air flow sensor which detects an intake air flow of the intake air pipe;

the second temperature sensor detects a temperature of an intake manifold portion on a downstream side of the throttle valve;

the second air pressure sensor detects an intake manifold pressure of the intake manifold portion;

the method further comprising;

a first step of calculating a second throttle upstream air mass from a first throttle upstream pressure calculated at a previous stroke of engine, the intake manifold pressure, a throttle upstream temperature, the atmospheric pressure, the intake air temperature, the intake air flow, and a first throttle intake air mass calculated at a previous stroke of engine;

a second step of selecting either one of the second throttle upstream air mass and a third throttle upstream air mass calculated from the atmospheric pressure and the intake air temperature, as a fourth throttle upstream air mass, depending on the operation load state of the engine;

a third step of calculating a second throttle upstream pressure from the fourth throttle upper air mass and the throttle upstream temperature; and controlling the least one actuator based on the calculated second upstream pressure.

12. The control method for an internal combustion engine with a supercharger according to claim 11, wherein the throttle upstream temperature is the intake manifold temperature or a temperature which is linearly approximated to the intake manifold temperature.

13. The control method for an internal combustion engine with a supercharger according to claim 11, wherein the throttle upstream temperature is a temperature which is detected by a sensor provided on the upstream side of the throttle valve.

14. The control method for an internal combustion engine with a supercharger according to claim 12, further comprising a fourth step of selecting either the intake manifold temperature or the temperature which is linearly approximated to the intake manifold temperature and the intake manifold temperature in synchronization with the operation load state of the engine as the throttle upstream temperature.

15. The control method for an internal combustion engine with a supercharger according to claim 11, further comprising a fifth step of calculating a lower limit value of the throttle upstream air mass from the intake manifold pressure and the throttle upstream temperature and selecting a larger one of the lower limit value or the second throttle upstream air mass.

16. The control method for an internal combustion engine with a supercharger according to claim 11, wherein
the third step includes a primary filtering for smoothing the second throttle upstream pressure.

17. The control method for an internal combustion engine with a supercharger according to claim 14, wherein
the fourth step further comprises filtering for smoothing the throttle upstream temperature selected.

18. The control method for an internal combustion engine with a supercharger according to claim 11, wherein
the operation load state of the engine is a throttle intake air amount of the throttle valve, calculated in process of calculating the second throttle upstream amount.

* * * * *